United States Patent [19]
Katoh

[11] Patent Number: 5,970,580
[45] Date of Patent: Oct. 26, 1999

[54] TILT HINGE FOR OFFICE AUTOMATION EQUIPMENT

[75] Inventor: Hideo Katoh, Kanagawa, Japan

[73] Assignee: Katoh Electrical Machinery Co., Ltd., Kanagawa, Japan

[21] Appl. No.: 09/046,491

[22] Filed: Mar. 23, 1998

[51] Int. Cl.[6] .................................................. E05C 17/64
[52] U.S. Cl. .............................................. 16/337; 16/386
[58] Field of Search .............................. 16/337, 338, 339, 16/340, 273, 274, 386

[56] References Cited

U.S. PATENT DOCUMENTS

| | | | |
|---|---|---|---|
| 3,497,909 | 3/1970 | Davis | 16/273 |
| 3,939,529 | 2/1976 | Davis | 16/273 |
| 5,109,570 | 5/1992 | Okada et al. | 16/337 |
| 5,208,944 | 5/1993 | Lu | 16/340 |
| 5,269,047 | 12/1993 | Lu | 16/340 |
| 5,702,197 | 12/1997 | Chen | 16/337 |
| 5,772,351 | 6/1998 | Ching | 16/337 |

*Primary Examiner*—Chuck Y. Mah
*Attorney, Agent, or Firm*—Notaro & Michalos P.C.

[57] ABSTRACT

A tilt hinge comprises a fixing member composed of a fixing base fixed to a main body of a device and a bearing plate; a rotating shaft having a small diameter part rotatably born at the bearing plate of this fixing member; a first friction washer placed between a large diameter part of the rotating shaft and one side surface of the bearing plate with its small diameter part being inserted into and passed through its central part; a second friction washer arranged to be contacted with the other side surface of the bearing plate with the small diameter part being inserted through its central part; a pressing plain washer arranged to be contacted with this second friction washer with the small diameter part being inserted into and passed through its central part; wherein the end part of the small diameter part is press fitted to cause the first friction washer to be press contacted between the bearing plate and the large diameter part and the second friction washer to be press contacted between the bearing plate and the spring washer.

4 Claims, 7 Drawing Sheets

TILT HINGE FOR OFFICE AUTOMATION EQUIPMENT

BACKGROUND OF THE INVENTION

1. Field of the Invention

This invention relates to a tilt hinge which is preferable when a display member of an office automation equipment such as a lap-top type personal computer or a word processor or the like.

2. Description of the Prior Art

The present applicant proposed in the past a tilt hinge for use in supporting a display member of an office automation equipment such as a lap top type personal computer or a word processor or the like in which its structure is simple and a stable frictional torque can be attained over a full-opened angle of the display member, wherein it is comprised of a fixing member to be fixed to a main body of the device and a rotating shaft having its reduced diameter part born at a bearing plate of the fixing member so as to support the display member, and various kinds of washers are placed between the rotating shaft and one side surface of the bearing plate and also between the other side surface of the bearing plate and a fixing end of the rotating shaft so as to cause the rotating shaft to be rotated only when a predetermined rotational torque is given to the rotating shaft.

In recent years, there has been present an occurrence of a trend in which these office automation equipment have been small in size and more thin in thickness and in compliance with this trend, it has been required to provide such a tilt hinge for use in supporting the display member as one having a smaller size, a certain durability and a high rotational torque.

3. Objects of the Invention

It is an object of the present invention to provide a tilt hinge in which its size can be made small, a more durability can be realized and a higher rotational torque can be produced.

In order to accomplish the aforesaid object, the present invention is comprised of a fixing member composed of a fixing base fixed to a main body of a device and a bearing plate, a rotating shaft also acting as a supporting member for a display member for use in rotatably supporting a small diameter part at the bearing plate for the fixing member, a first friction washer placed between a large diameter part of the rotating shaft and one side surface of the bearing plate while having its small diameter part inserted at a central part thereof, a second friction washer arranged while being contacted with the other side surface of the bearing plate and having the small diameter part inserted at its central part and a pressing plain washer contacted with the second friction washer and having the small diameter part inserted at its central part, wherein an end part of the small diameter part is press fitted to cause the first friction washer to be press contacted between the bearing plate and the large diameter part, the second friction washer to be press contacted between the bearing plate and the spring washer, when the rotating shaft is rotated, lubricant is coated at portions generating sliding friction either between the first friction washer and the bearing plate, or between the first friction plate and the large diameter part, and either between the second friction washer and the bearing plate, or between the second friction washer and a spring washer.

DESCRIPTION OF THE PREFERRED EMBODIMENTS

Figure 1:
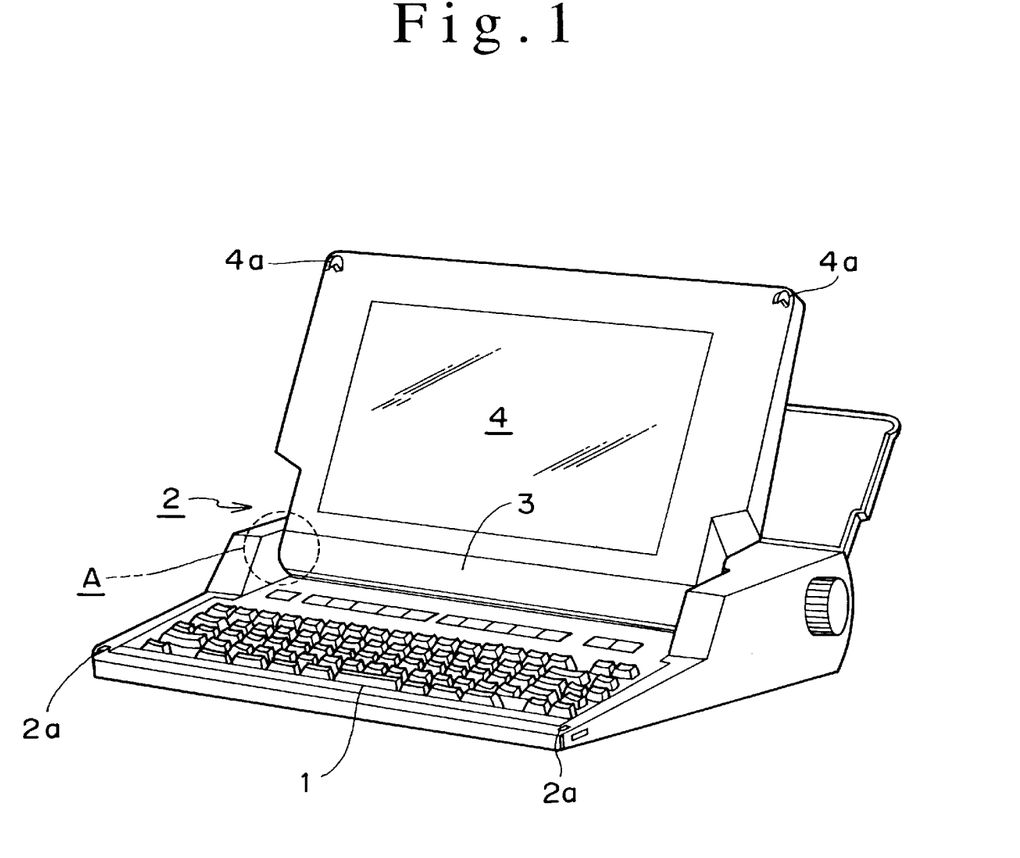
FIG. 1 is a perspective view for showing a lap-top type personal computer to which the present invention is embodied.

The drawings illustrate some preferred embodiments of the present invention, wherein in FIG. 1, a display member 4 having some liquid crystals therein is fixed, through a fixing section 3, to a main body 2 of device of a lap-top type personal computer in such a way that it may be freely opened or closed. In the preferred embodiment shown in FIG. 1, the display member 4 is shown in its opened state and this display member 4 is kept closed when it is not used, and engaging pieces 4a, 4a projected from the display member 4 are engaged with engaging holes 2a, 2a arranged at the main body 2 of the device and locked there.

Figure 2:
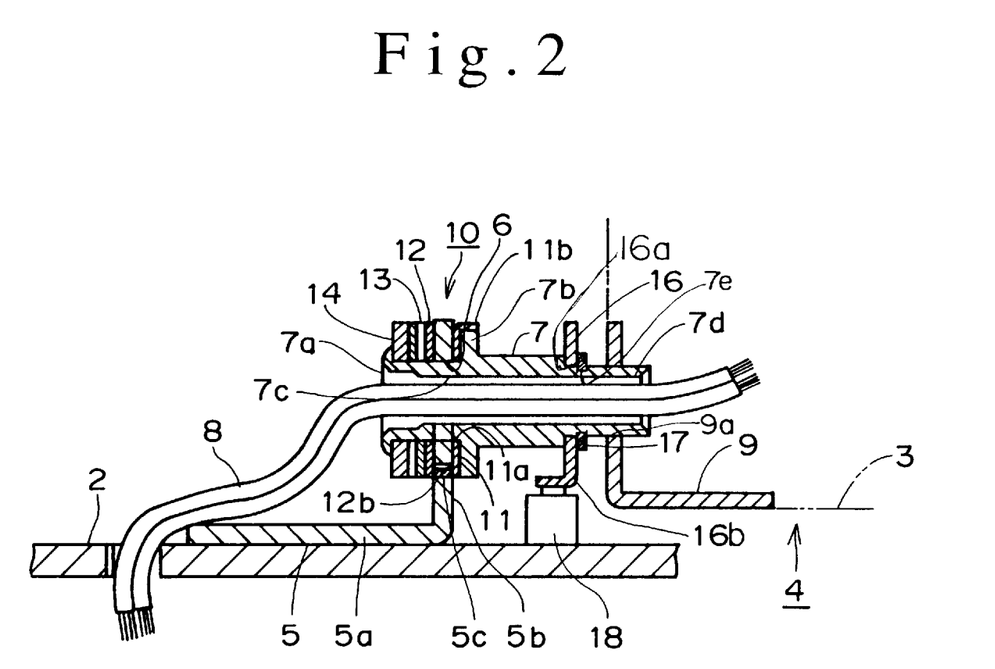
FIG. 2 is an enlarged sectional view for showing such a part as seen at an arrow A in FIG. 1.
Figure 3:
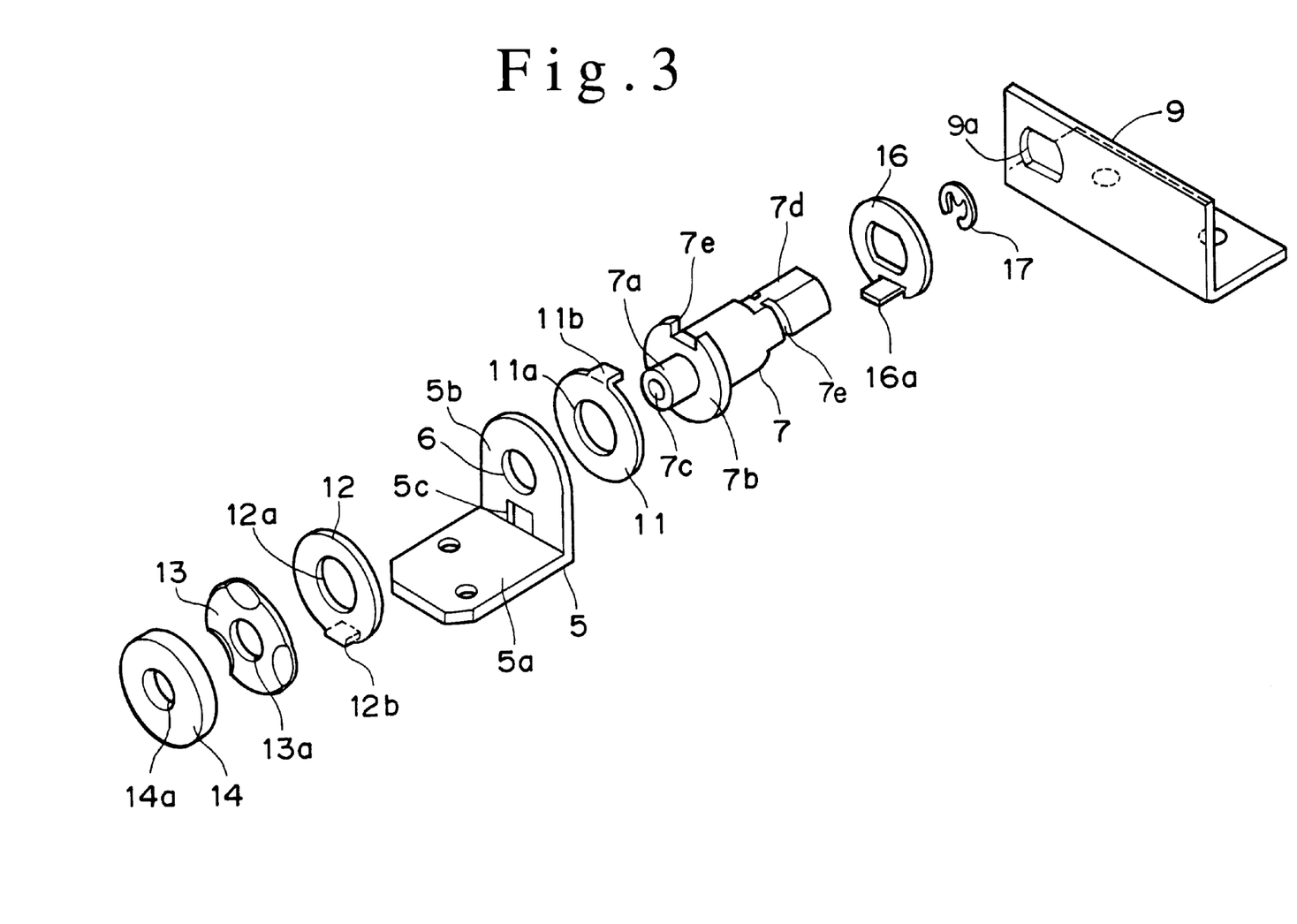
FIG. 3 is an exploded perspective view for showing a tilt hinge of the present invention.

The tilt hinge for use in opening or closing the display member 4 is mounted at such a part as seen at an arrow A in FIG. 1 and its structure is shown in FIGS. 2 and 3.

In reference to the drawings, FIGS. 2 and 3 show that reference numeral 5 denotes a fixing member which is composed of metallic material such as an iron plate and this fixing member is fixed to a main body 2 of the device. This fixing member 5 is constructed as shown in particular in FIG. 2 so that a fixing base 5a and a bearing plate 5b are bent in an L-shape in section, the bearing plate 5b is provided with a bearing hole 6 and then the fixing base 5a is fixed on the main body 2 of the device. Within the bearing hole 6 is born a rotating shaft 7 acting as a supporting member at its small diameter part 7a, the rotating shaft 7 is provided with a large diameter part 7b subsequent to the small diameter part 7a and at the same time it has a through-pass hole 7c axially passing through the rotating shaft and as shown in FIG. 2 in particular, a cable 8 fed out of the main body 2 of the device passes within the through-pass hole 7c and is extended into the display member 4. A deformed fixing part 7d is arranged in subsequent to the large diameter part 7b of the rotating shaft 7, and there is fixed a projecting part 3 of the display member 4 through a bracket 9 having an end part of the deformed fixing part 7d fitted and fixed to the deformed hole 9a.

Then, a friction mechanism 10 will be described, wherein a first friction washer 11 made of metallic material such as phosphor bronze, for example, having an anti-wearing characteristic and a sufficient mechanical strength is arranged between the large diameter part 7b of the rotating shaft 7 and one side surface of the bearing plate 5 with the small diameter part 7a being inserted into a through-pass hole 11a. An engaging projection piece 11b is projected and arranged from an outer circumference of the large diameter part 7b of the rotating shaft 7, the engaging projection piece 11b is engaged with an engaging part 7e arranged at an outer circumference of the large diameter part 7b of the rotating shaft 7. A second friction washer 12 made of metallic material such as phosphor bronze, for example, having similarly an anti-wearing characteristic and a high mechanical strength is contacted with the other side surface of the bearing plate 5b, and subsequently a spring washer 13 is abutted against it and the small diameter part 7a of the rotating shaft 7 is passed through insertion holes 12a, 13a. An engaging projection piece 12b is projected and arranged at an outer circumference of the second friction washer 12, and the engaging projection piece 12b is engaged with an engaging hole 5c arranged at the bearing plate 5b. Further, a pressing plain washer 14 is abutted against the spring washer 13 by passing the small diameter part 7a of the rotating shaft 7 into the insertion hole 14a, an end section of the small diameter part 7a is press fitted to form the press fitting part 7f, thereby as shown in FIG. 2 in particular, the first friction washer 11 becomes a state in which it is press contacted with the bearing plate 5b of the fixing member 5, and the second friction washer 12 is press contacted with the spring washer 13. An outer diameter of the large diameter part 7b and an outer diameter of the first friction washer 11 are substantially the same to each other and also an outer diameter of the pressing plain washer 14 and an outer diameter of each of the second friction washer 12 and the spring washer 13 are also substantially the same to each other, so that the first friction washer 11 and the second friction washer 12 are uniformly press contacted with the bearing plate 5b of the fixing member 5 and the spring washer 13 over their entire surfaces. Lubricant not shown in the figure is coated between the first friction washer 11 and the bearing plate 5b and between the spring washer 13 and the second friction washer 12 where sliding friction may occur due to rotation of the rotating shaft 7 through the bracket 9 as the display member 4 is opened or closed. In addition, the operation plate 16 is engaged with and fixed to the deformed fixing part 7d of the rotating shaft 7 by inserting the deformed fixing part 7d into the deformed hole 16a and further fixed by an E-ring 17 fitted into a circumferential groove 7g from its radial direction so as not to be pulled out of it. In particular, as shown in FIG. 2, reference numeral 18 denotes a micro-switch which is turned on or off by the operating piece 16b of the operating plate 16 through the rotating shaft 7 rotating together when the display member 4 is opened or closed.

Figure 4:
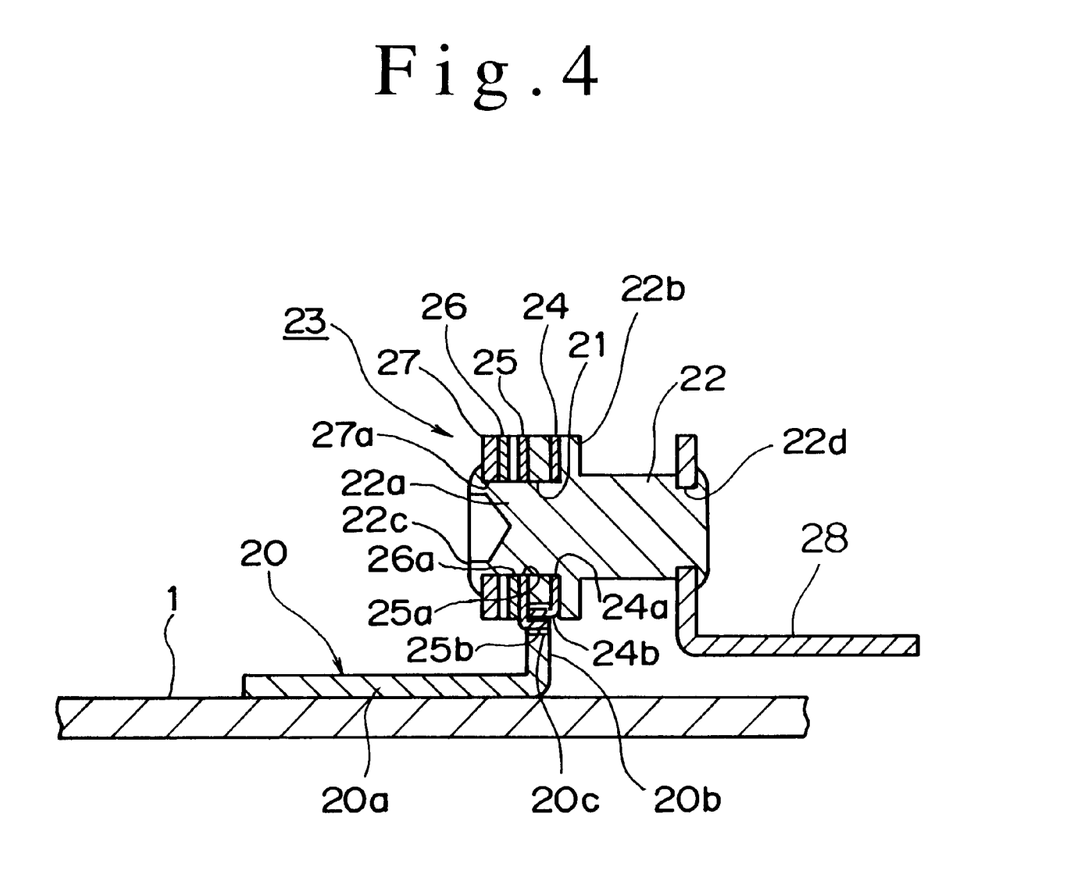
FIG. 4 is a sectional view for showing another preferred embodiment of the present invention.
Figure 5:
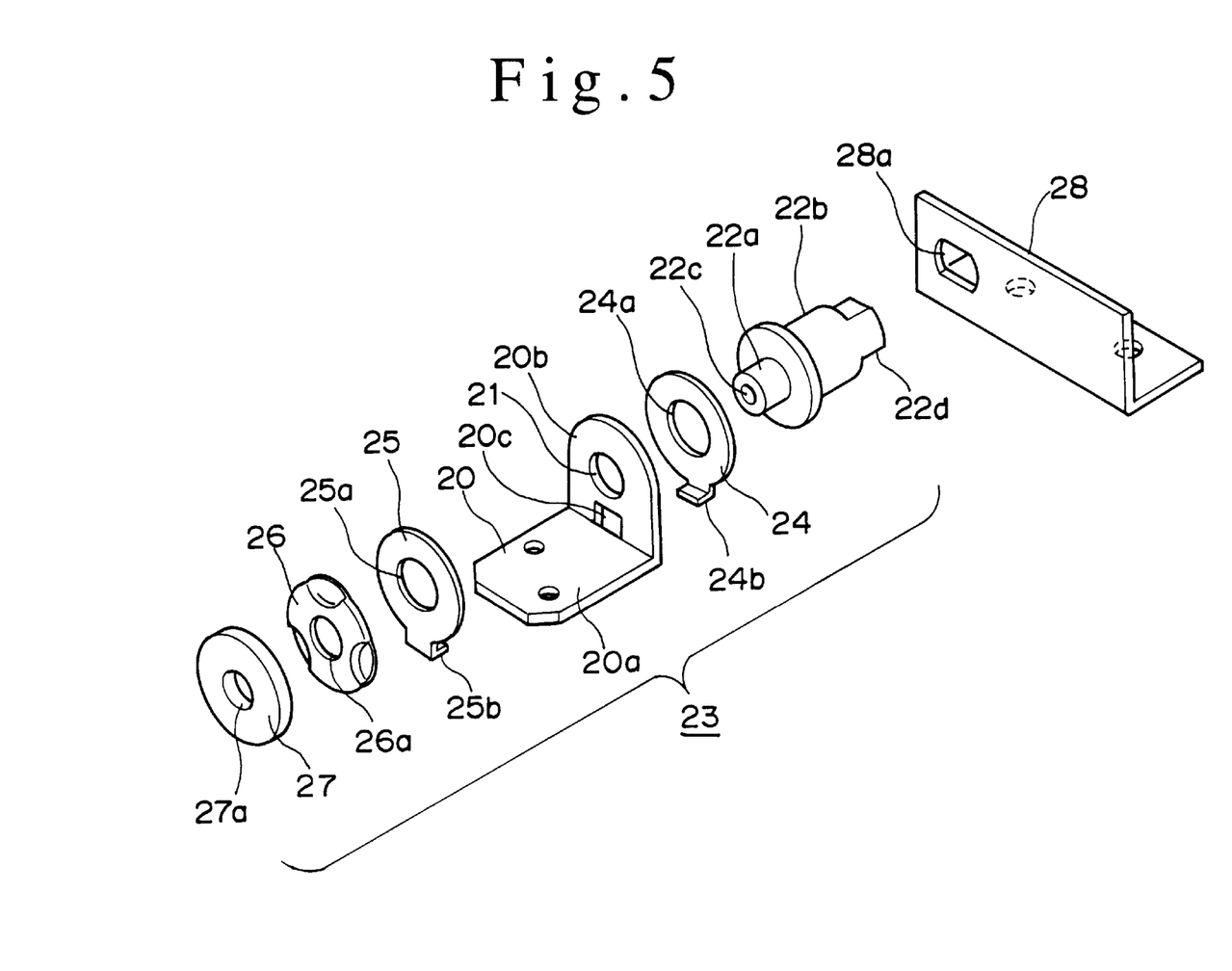
FIG. 5 is an exploded perspective view for showing the tilt hinge shown in FIG. 4.

FIGS. 4 and 5 illustrate another preferred embodiment, wherein reference numeral 20 denotes a fixing member fixed to the main body of the device, the fixing member is bent into a form having a substantial L-shaped section to provide a fixing base 20a and a bearing plate 20b, the bearing plate 20b being provided with a bearing hole 21. Within the bearing hole 21 is born the rotating shaft 22 also acting as a supporting member at its small diameter part 22a, and the rotating shaft 22 is provided with a large diameter part 22b subsequent to the small diameter part 22a.

Then, the friction mechanism 23 will be described as follows, wherein a first friction washer 24 made of metallic material such as phosphor bronze, for example, having a sufficient anti-wearing characteristic and a superior mechanical strength is placed between the large diameter part 22b of the rotating shaft 22 and one side surface of the bearing plate 20b while the small diameter part 22a is being inserted into the insertion hole 24a. An engaging projection piece 24b is projected from and arranged at an outer circumference of the first friction washer 24 and engaged with the engaging hole 20c arranged in the bearing plate 22b. To the other side of the bearing plate 20b is similarly contacted a metallic second friction washer 25 made of metallic material such as phosphor bronze, for example, having a sufficient anti-wearing characteristic and a superior mechanical strength, subsequently a spring washer 26 is abutted against it and then a small diameter part 22a of the rotating shaft 22 is passed through the insertion holes 25a, 26a. An engaging projection piece 25b is projected from and arranged at an outer circumference of the second friction washer 25 and engaged with an engaging hole 20c arranged at the bearing plate 20b. To the spring washer 26 is further abutted a pressing plain washer 27 with the small diameter part 22a of the rotating shaft 22 being passed through its insertion hole 27a. The end part of the small diameter part 22a is press fitted to form a press fitting part 22c, thereby the first friction washer 24 is press contacted with the large diameter part 22b and the second friction washer 25 is press contacted with one side surface of the spring washer 26. Reference numeral 28 denotes a bracket for use in fixing the display member with its deformed hole 28a being inserted into and fixed to the deformed fixing part 22d of the rotating shaft 22. This bracket 28 may be eliminated and the display member may be fixed to the rotating shaft 22. Then, lubricant not shown is coated between the first friction washer 24 and the large diameter part 22b and between the spring washer 26 and the second friction washer 25 where sliding friction is generated due to rotation of the rotating shaft 22 through the bracket 28 as the display member not shown is opened or closed.

Figure 6:
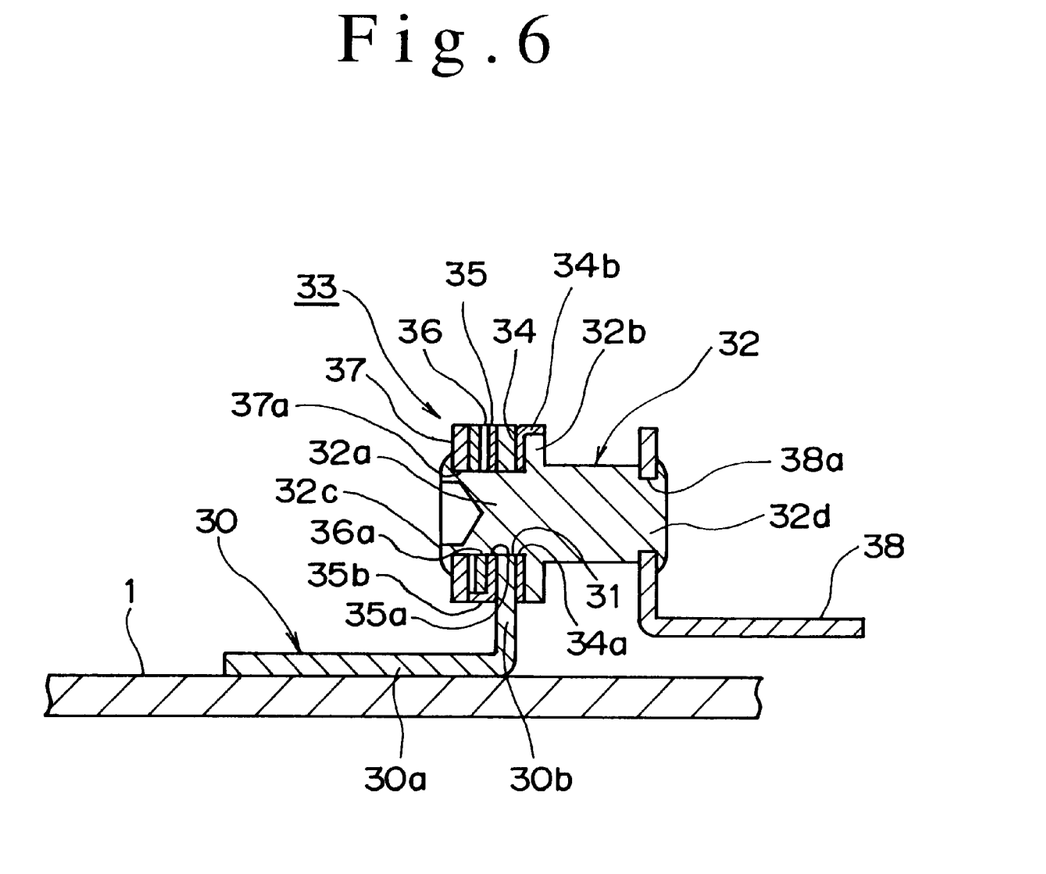
FIG. 6 is a sectional view for showing a still further preferred embodiment of the present invention.
Figure 7:
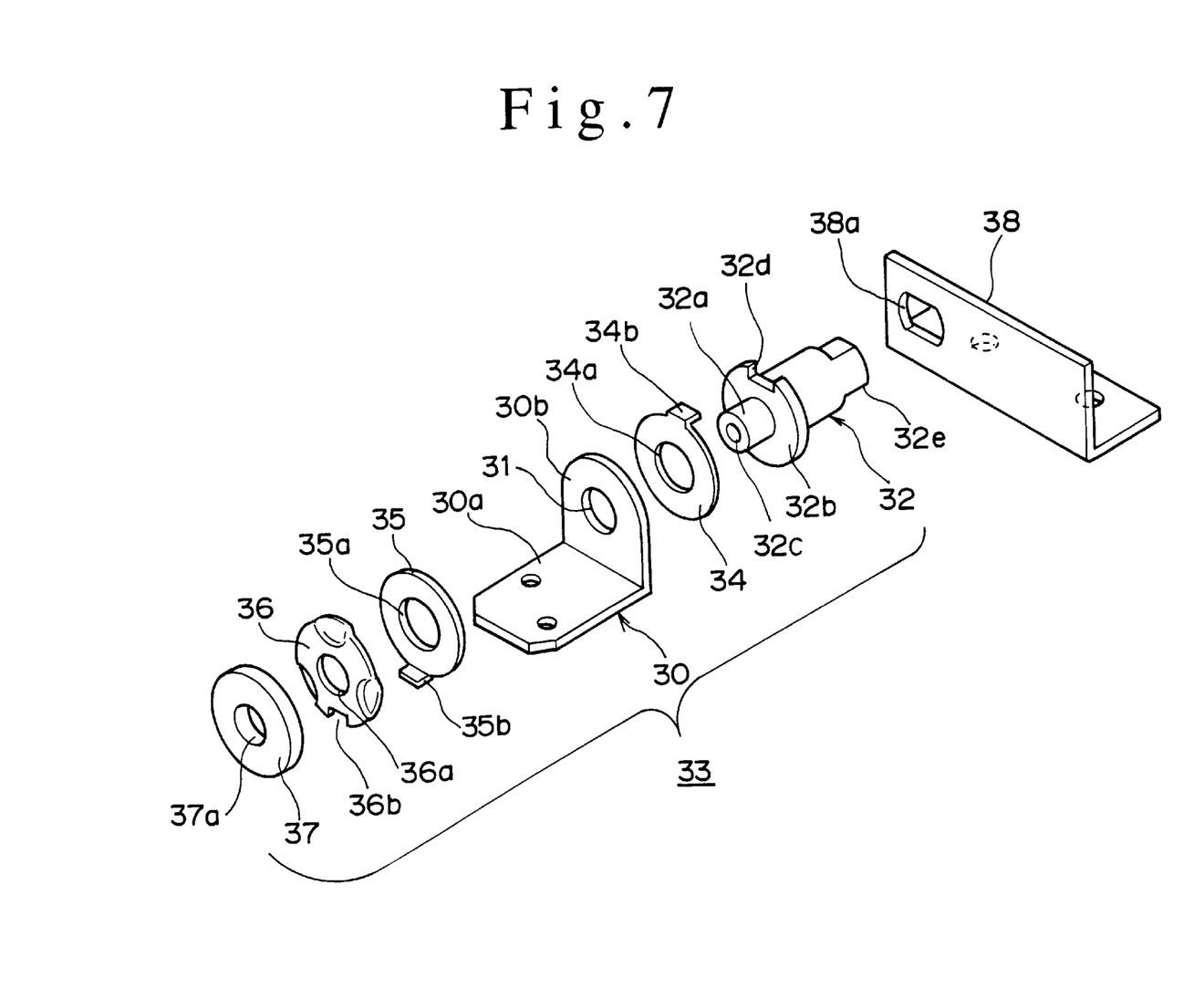
FIG. 7 is an exploded perspective view for showing the tilt hinge shown in FIG. 6.

FIGS. 6 and 7 illustrate a still further preferred embodiment of the present invention, wherein reference numeral 30 denotes a fixing member to be fixed to the main body of the device, the fixing member is bent into a substantial L-shaped section to make a fixing base 30a and a bearing plate 30b, and the bearing plate 30b is provided with a bearing hole 31. A rotating shaft 32 also acting as a supporting member is born at its small diameter part 32a in the bearing hole 31, and the rotating shaft 32 is provided with a large diameter part 32b subsequent to the small diameter part 32a.

Then, a friction mechanism 33 will be described as follows. A metallic first friction washer 34 made of metallic material such as phosphor bronze, for example, having a sufficient anti-wearing characteristic and a superior mechanical strength is arranged between the large diameter part 32b of the rotating shaft 32 and one side surface of the bearing plate 30b with its small diameter part 32a being inserted into the insertion hole 34a. An engaging projection piece 34b is projected from and arranged at an outer circumference of the first friction washer 34 and engaged with an engaging part 32d arranged at the large diameter part 32b of the rotating shaft 32. To the other side surface of the bearing plate 30b is contacted a metallic second friction washer 35 made of metallic material such as phosphor bronze, for example, having a sufficient anti-wearing characteristic and a superior mechanical strength is contacted, then a spring washer 36 is abutted against it and the small diameter part 32a of the rotating shaft 32 is passed through the insertion holes 35a, 36a. An engaging projection piece 35b is projected from and arranged at an outer circumference of the second friction washer 35 and further engaged with the engaging part 36b arranged in the spring washer 36. To the spring washer 36 is further abutted a pressing plain washer 37 with the small diameter part 32a of the rotating shaft 32 being passed through its insertion hole 37a. The end part of the small diameter part 32a is press fitted to form a press fitting part 32c, thereby the first friction washer 34 and the second friction washer 35 are press contacted together with both sides of the bearing plate 30b of the fixing member 34. Reference numeral 38 denotes a bracket for use in fixing the display member with its deformed hole 38a being inserted into and fixed to the deformed fixing part 32e of the rotating shaft 32. This bracket 38 maybe eliminated and the display member may be fixed directly to the deformed fixing part 32d. Then, lubricant not shown is coated between the first friction washer 34 and the bearing plate 30b and between the second friction washer 35 and the bearing plate 30b where sliding friction is generated due to rotation of the rotating shaft through the bracket 38 as the display member not shown is opened or closed.

Although not shown, as a still further preferred embodiment, it may also be applicable that the first friction washer is engaged with the bearing plate, the second friction washer is engaged with the spring washer to cause a sliding friction to be generated between the first friction washer and the large diameter part and between the second friction washer and the bearing plate, respectively.

In addition, as the lubricant applied to all the preferred embodiments described above, it is also possible to apply molybdenum coat or grease of molybdenum groups.

What is claimed is:

1. A tilt hinge for an office automation device comprising:

a fixing member composed of a fixing base and a bearing plate bent vertically from said fixing member, said bearing plate having a bearing hole;

a rotating shaft having a small diameter part rotatably born in the bearing hole of the bearing plate, a large diameter part and a deforming fixing part at an end thereof;

a first friction washer having a through-pass hole and placed between said large diameter part of the rotating shaft and one side surface of said bearing plate with said small diameter part being inserted into and passed through said through-pass hole of said first friction washer;

a second friction washer having a through-pass hole and arranged to be contacted with the other side surface of said bearing plate with said small diameter part being inserted through said through-pass hole of said second friction washer;

a spring washer having a through-pass hole and arranged to be contacted with this second friction washer with said small diameter part being inserted through said through-pass hole of said spring washer; and a pressing plain washer having a through-pass hole and arranged to be contacted with this spring washer with said small diameter part being inserted through said through-pass hole of said pressing plain washer;

a press fitting part at an end section of the small diameter part for contacting in a pressing condition said first friction washer to said bearing plate and said second friction washer to said spring washer, wherein, said first friction washer is engaged with said rotating shaft and rotated together with said rotating shaft, said second friction washer is engaged with said bearing plate, said spring washer is co-rotated with the rotating shaft and at the same time lubricant is coated between said first friction washer and said bearing plate and between said second friction washer and said spring washer, thereby when said rotating shaft is rotated, a sliding friction is generated between said first friction washer and the bearing plate and between said second friction washer and said spring washer, respectively.

2. A tilt hinge for an office automation device comprising:

a fixing member composed of a fixing base and a bearing plate bent vertically from said fixing member, said bearing plate having a bearing hole;

a rotating shaft having a small diameter part rotatably born in the bearing hole of the bearing plate, a large diameter part and a deforming fixing part at an end thereof;

a first friction washer having a through-pass hole and placed between said large diameter part of the rotating shaft and one side surface of said bearing plate with said small diameter part being inserted into and passed through said through-pass hole of said first friction washer;

a second friction washer having a through-pass hole and arranged to be contacted with the other side surface of said bearing plate with said small diameter part being inserted through said through-pass hole of said second friction washer;

a spring washer having a through-pass hole and arranged to be contacted with this second friction washer with said small diameter part being inserted through said through-pass hole of said spring washer; and a pressing washer having a through-pass hole and arranged to be contacted with this spring washer with said small diameter part being inserted through said through-sass hole of said pressing washer; and a press fitting part at an end section of the small diameter part for contacting in a pressing condition said first friction washer to said bearing plate and said second friction washer to said spring washer, wherein, said first friction washer is engaged with said rotating shaft and rotated together with said rotating shaft, said second friction washer is engaged with said spring washer or rotating shaft, and further said spring washer is co-rotated with said rotating shaft or said spring washer and at the same time lubricant is coated between said first friction washer and said bearing plate and between said second friction washer and said bearing plate, thereby when said rotating shaft is rotated, a sliding friction is generated between said first friction washer and said bearing plate and between said second friction washer and said bearing plate, respectively.

3. A tilt hinge for an office automation device comprising:

a fixing member composed of a fixing base and a bearing plate bent vertically from said fixing member, said bearing plate having a bearing hole;

a rotating shaft having a small diameter part rotatably born in said bearing hole of said bearing plate, a large diameter part and a deforming fixing part at an end thereof;

a first friction washer having a through-pass hole and placed between said large diameter part of this rotating shaft and one side surface of said bearing plate with said small diameter part being inserted into and passed through said through-pass hole of said first friction washer;

a second friction washer having a through-pass hole and arranged to be contacted with the other side surface of said bearing plate with said small diameter part being inserted through said through-pass hole of said second friction washer;

a spring washer having a through-pass hole and arranged to be contacted with this second friction washer with said small diameter part being inserted through said through-pass hole of said spring washer; and a pressing plain washer having a through-pass hole and arranged to be contacted with this spring washer with said small diameter part being inserted through said through-pass hole of said pressing plain washer; and a press fitting part at an end section of the small diameter part for contacting in a pressing condition said first friction washer to said bearing plate and said second friction washer to said spring washer, wherein, said first friction washer is engaged with said bearing plate, said second friction washer is engaged with said bearing plate, and further said spring washer is co-rotated with said rotating shaft and at the same time lubricant is coated between said first friction washer and said large diameter part and between said second friction washer and said spring washer, thereby when said rotating shaft is rotated, a sliding friction is generated between said first friction washer and said large diameter part and between said second friction washer and said spring washer, respectively.

4. A tilt hinge for an office automation device comprising:

a fixing member composed of a fixing base and a bearing plate bent vertically from said fixing member, said bearing plate having a bearing hole;

a rotating shaft having a small diameter part rotatably born in the bearing hole of the bearing plate, a large diameter part and a deforming fixing part at an end thereof;

a first friction washer having a through-pass hole and placed between a large diameter part of this rotating shaft and one side surface of said bearing plate with its small diameter part being inserted into and passed through said through-pass hole of said first friction washer;

a second friction washer having a through-pass hole and arranged to be contacted with the other side surface of said bearing plate with said small diameter part being inserted through said through-pass hole of said second friction washer;

a spring washer having a through-pass hole and arranged to be contacted with this second friction washer with said small diameter part being inserted through said through-pass hole of said spring washer; and a pressing plain washer having a through-pass hole and arranged to be contacted with this spring washer with said small diameter part being inserted through said through-pass hole of said pressing plain washer; and a press fitting part at an end section of the small diameter part for contacting in a pressing condition said first friction washer to said bearing plate and said second friction washer to said spring washer, wherein, said first friction washer is engaged with said bearing plate, said second friction washer is engaged with said spring washer or said rotating shaft, and further said spring washer is co-rotated with the rotating shaft or said spring washer and at the same time lubricant is coated between said first friction washer and said large diameter part and between said second friction washer and said bearing plate, thereby when said rotating shaft is rotated, a sliding friction is generated between said first friction washer and said large diameter part and between said second friction washer and said bearing plate, respectively.

\* \* \* \* \*